No. 738,470. PATENTED SEPT. 8, 1903.
W. A. McDANIEL.
CARPET BEATER.
APPLICATION FILED SEPT. 8, 1902.
NO MODEL.
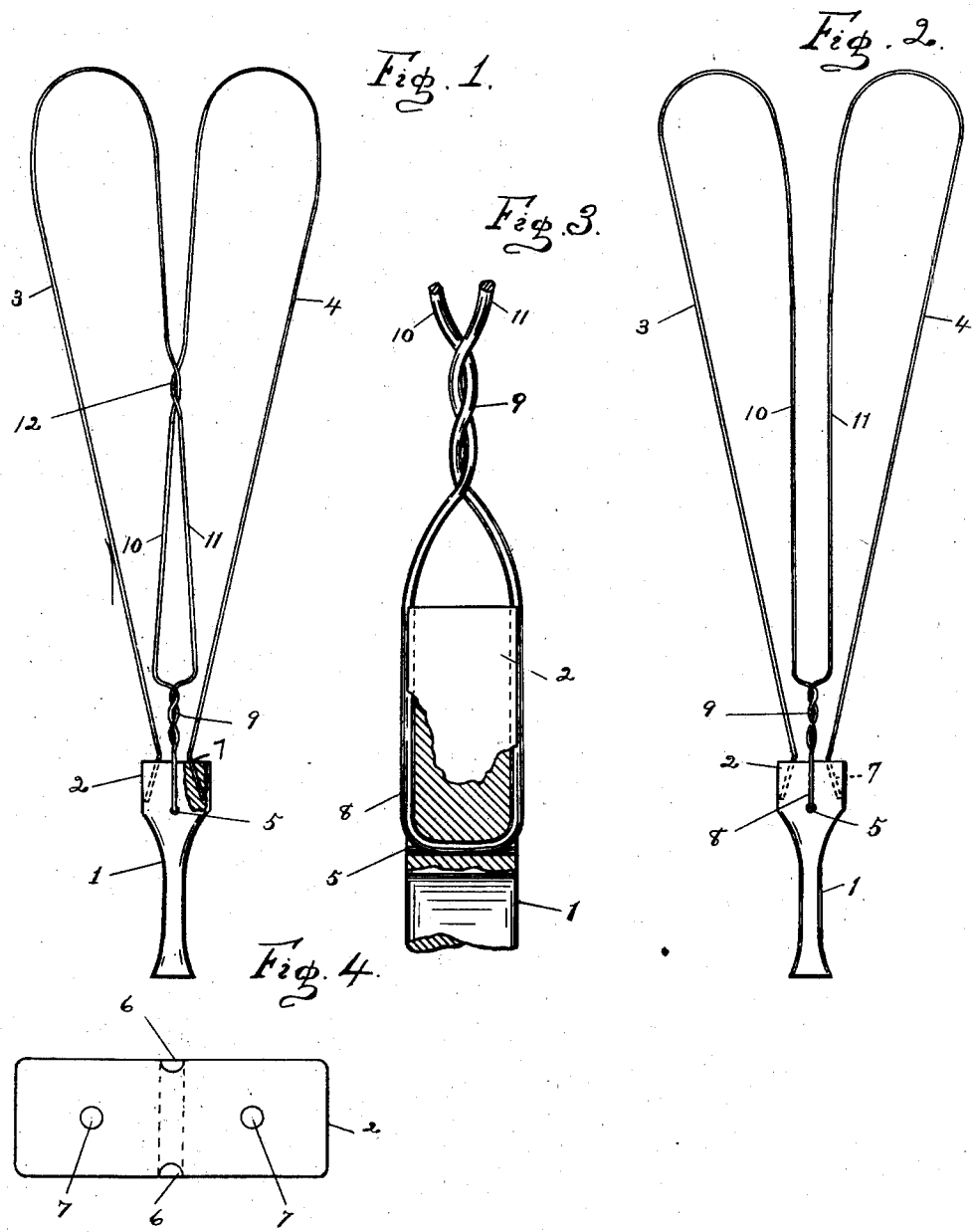
WITNESSES:
Adelaide Kearns
Augusta Viberg
William A. McDaniel INVENTOR
By Chapin & Denny
His ATTORNEYS No. 738,470. Patented September 8, 1903.

UNITED STATES PATENT OFFICE.

WILLIAM A. McDANIEL, OF FORT WAYNE, INDIANA, ASSIGNOR OF ONE-HALF TO CHARLES W. SCHERER, OF FORT WAYNE, INDIANA.

CARPET-BEATER.

SPECIFICATION forming part of Letters Patent No. 738,470, dated September 8, 1903.

Application filed September 8, 1902. Serial No. 122,471. (No model.)

*To all whom it may concern:*

Be it known that I, WILLIAM A. McDANIEL, a citizen of the United States, residing at Fort Wayne, in the county of Allen, in the State of Indiana, have invented certain new and useful Improvements in Carpet-Beaters; and I do hereby declare that the following is a full, clear, and exact description of the invention, which will enable others skilled in the art to which it appertains to make and use the same, reference being had to the accompanying drawings, which form part of this specification.

My invention relates to improvements in carpet-beaters.

It is well known that the leading essential features of a hand carpet-beater are cheapness, lightness, flexibility, and durability and that the great defect in the present carpet-beaters is their weakness at the point of union between the operative parts thereof, particularly the tendency of the beater-fingers to pull out of the handle and of the handle to split and break.

The object of my present invention is to provide a carpet-beater of great strength, lightness, and flexibility, formed of but two parts so united as to overcome all liability to become disunited in use.

My invention consists of a single piece of wire formed into a pair of beater-loops united with each other and with the wooden handle by a novel interlocking union, whereby the tendency to the splitting of the handle is avoided under the lateral strains thereon incident to use.

Similar reference-numerals indicate like parts throughout the several views, in which—

Figure 1 is a side view of my invention with the handle partly broken away to show the manner of securing the ends of the wire beater therein. Fig. 2 is a similar view of a slightly-modified form of the same. Fig. 3 is an enlarged view of the upper end of the handle broken away in part and showing the manner of securing the looped and twisted end of the wire beater in the handle, this view being taken at right angles to the views in Figs. 1 and 2. Fig. 4 is an enlarged detail plan of the upper end of the handle, showing the relative arrangement of the vertical grooves and slots in which the adjacent ends of the wire fingers are secured.

The handle of any desired form and material, preferably of a single piece of wood, as shown, having an enlargement upon each end thereof, the forward one 2 being adapted to form a hand-guard and also to secure the beater-fingers about to be described. The beater-fingers 3 and 4, preferably two in number, are formed of wire loops arranged in the same plane and made of a single piece of wire and secured to the handle 1 as follows: The handle 1 has its enlarged upper end 2 provided with a transverse aperture 5 and a pair of opposite vertical grooves 6, extending from the said aperture to the upper end of the handle and arranged approximately midway of the length of said end. This portion of the handle 1 also has oblique longitudinal slots or openings 7 near the opposite edges of the said handle, Figs. 1 and 2. A piece of wire of proper size, strength, and flexibility is first passed through the aperture 5 and then bent upward into a loop 8 midway of its ends, the sides of which loop rest snugly in the said grooves 6 and are then brought together in a double twist 9, Fig. 3, after which the wires 10 and 11 are continued upward in the same place to form the inner side of the respective loops 3 and 4. The wires 10 and 11 after forming the inner sides of the beater-loops of proper length are bent downward to form the outer sides of the said loops and have their free ends tightly inserted into the respective oblique openings 7. If desired, the strength and rigidity of the beater-loops or fingers can be materially increased by uniting the inner sides of the said loops at or near the middle of their length by a twist 12, as shown in Fig. 1.

It is obvious that as the loop 8 passes through the handle and is firmly secured in the opposite lateral grooves 6 and that as the free ends of the wire are bent to fit the oblique openings 7 the wire beaters or looped fingers are rigidly and securely united to the handle, with no tendency whatever to become separated in use or to cause a splitting strain upon the handle. It is also obvious that my improved beater is cheap, simple, and of a durable construction without in the least sacrificing its lightness and flexibility. While the grooves 6 are not absolutely essential to my invention, they are preferably employed.

Having thus described my invention, what I desire to secure by Letters Patent is—

1. As an article of manufacture a carpet-beater formed of two coöperative parts comprising a wooden handle having a transverse aperture in its upper end and provided with opposite lateral grooves, a pair of beater-loops formed of a single piece of wire which is passed through the said aperture, bent into a holding-loop at or near the middle of its length, then twisted at a point adjacent to the handle, and then formed into a pair of beater-loops in the same plane, and whose free ends are obliquely bent and then rigidly secured in said handle, substantially as shown and described.

2. A carpet-beater comprising a handle pierced, and a pair of beater-loops formed of a single piece of wire which is passed through the said handle and twisted, at a point adjacent to the handle and then bent outwardly into two loops, whose opposite ends are rigidly secured in said handle substantially as shown and described.

Signed by me at Fort Wayne, Allen county, State of Indiana, this 3d day of September, A. D. 1902.

WILLIAM A. McDANIEL.

Witnesses:
ADELAIDE KEARNS,
AUGUSTA VIBERG.